March 12, 1968     W. J. DAVIES ETAL     3,372,961
BEARING
Filed Dec. 13, 1965
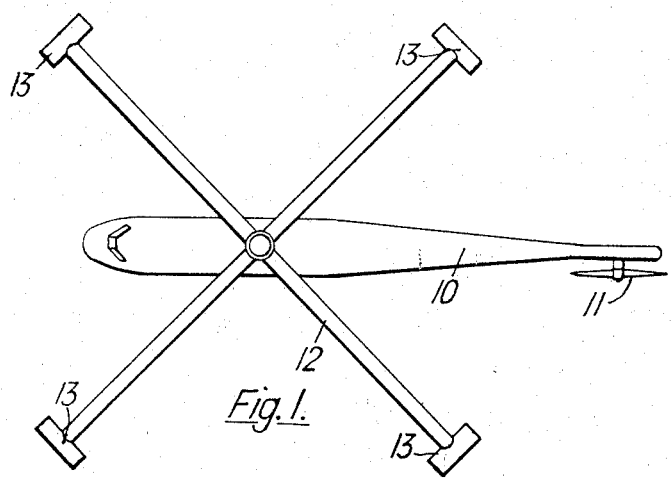
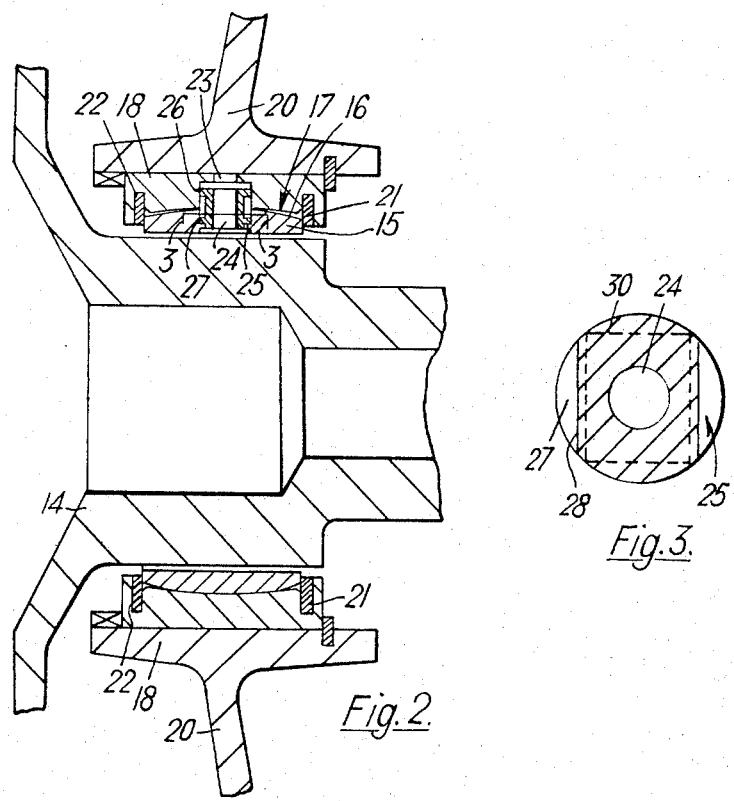
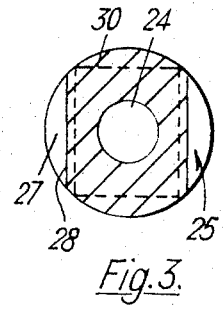

3,372,961
BEARING
William John Davies and John Kenneth Rhodes, Derby, England, assignors to Rolls-Royce Limited, Derby, England, a British company
Filed Dec. 13, 1965, Ser. No. 513,367
Claims priority, application Great Britain, Dec. 30, 1964, 52,886/64
8 Claims. (Cl. 308—72)

ABSTRACT OF THE DISCLOSURE

A bearing device, primarily for use in supporting the shaft of a gas turbine jet propulsion engine adapted to be used as a "tip jet" on the end of a helicopter rotor blade, has a bush within which a shaft is rotatably mounted and a fixed housing within which the bush is mounted. The outer surface of the bush is arcuate in a plane containing the axis of the shaft and abuts the inner surface of the fixed housing which is arcuate in the same plane. The radius of curvature of the inner surface of the housing is greater than the radius of curvature of the outer surface of the bush to permit the bush to rock within the housing and thus accommodate tilting of the shaft relative to the housing. The bush is biased to a tilted position with respect to the housing and shaft to prevent unobstructed axial flow passages being formed between the shaft, bush and housing.

---

This invention concerns a bearing device and, although not so restricted, it will hereinafter be described with reference to its use in supporting the shaft of a gas turbine jet propulsion engine adapted to be used as a "tip jet" on the end of a helicopter blade.

According to the present invention there is provided a bearing device comprising a bush within which a shaft may be rotatably mounted, the outer surface of the bush being arcuate in a plane containing the axis of the shaft and abutting an inner surface of a fixed housing within which the bush is mounted, said inner surface being arcuate in the said plane, the radius of curvature of the inner surface of said housing being greater than the radius of curvature of the outer surface of said bush to permit the bush to rock within the housing so as to accommodate tilting of the shaft relative to the housing.

Such an arrangement is preferable to one in which the radius of the inner surface of the housing is the same as that of the outer surface of the bush since the bush can move more easily in the present arrangement. Thus the "rock" or "rolling" action between the bush and the housing may be more easily effected than the sliding action which would take place with surfaces of equal radii of curvature.

Preferably the inner surface of the bush provides a plain bearing for the shaft.

The bush may be biased to a tilted position with respect to the housing and shaft such that no unobstructed axial low passages are formed between the shaft, bush and housing. This has the effect of precluding the forcing of oil therethrough which might otherwise take place while the bearing is lightly loaded.

The biasing of the bush may be provided by annular springs provided on each side of the bush.

Means may be provided for supplying the inner surface of the bush with oil. Thus said means may comprise a substantially cylindrical bobbin with its axis radially disposed, the bobbin being situated within co-operating apertures in said housing and bush respectively, the bobbin having an oil supply passageway therethrough and being provided with portions of reduced cross section to accommodate relative movement between said housing and bush.

Thus the bobbin may have annular flanges adjacent each of its ends being respectively disposed within said co-operating apertures, flats being formed at diametrically opposed positions on the external surface of said bobbin to provide said portions.

Preferably means are provided for preventing said bobbins from rotating about its longitudinal axis.

The bush may be asymmetric about a central plane perpendicular to its axis such that tilt of the bush with respect to the shaft is cancelled out at one particular inclination of the shaft.

The invention also includes a gas turbine jet propulsion engine provided with a bearing device as set forth above. The engine may be adapted to be mounted on the end of a blade of a helicopter rotor.

The invention also includes a helicopter rotor provided with an engine as set forth above.

The invention is illustrated merely by way of example in the accompanying drawings, in which:

FIGURE 1 is a plan view of a helicopter provided with "tip jet" engines having bearings in accordance with the present invention, FIGURE 2 is an enlarged part sectional elevation of part of one of the engines shown in FIGURE 1, and FIGURE 3 is a part sectional plan on the line 3—3 of FIGURE 2.

Referring to the drawings, there is shown a helicopter 10 having a tail rotor 11 and a main rotor 12. Rotor 12 has four blades at the end of each of which there is disposed a gas turbine jet propulsion engine 13.

As seen in FIGURE 2, each propulsion engine 13 has a main shaft 14 on which are mounted the compressor and turbine of the engine (not shown). The shaft 14 is journalled within and spaced by an annular gap from a plain bearing provided by the cylindrical inner surface of a bush 15. The outer surface 16 of bush 15 is arcuate in a plane containing the axis of the shaft 14 and abuts the inner surface 17 of an annular housing 18. Inner surface 17 is also arcuate in the said plane but has a larger radius of curvature than outer surface 16. Housing 18 is fixed within fixed structure 20 of the engine. Annular springs 21, 22 are provided in housing 18 and abut bush 15 at each end thereof.

Oil is supplied to the inner surface of bush 15 via an oil feed duct 23 in housing 18 and through an oil supply passageway or drilling 24 provided in a substantially cylindrical bobbin 25 whose axis is radially disposed. Bobbin 25 is provided adjacent each of its ends with annular flanges 26, 27 which are respectively disposed within cooperating apertures in housing 18 and bush 15. Flats 28 are milled at diametrically opposed positions on the external surface of the substantially cylindrical bobbin 25 to provide portions of reduced cross section along a substantial length of the bobbin and adjacent the interface between bush 15 and housing 18. A rectangular boss 30 is formed at the innermost end of bobbin 25 and this rests within a corresponding aperture formed in the bush 15 to prevent rotation of the bobbin 25 about its longitudinal axis.

When the rotor 12 of the helicopter 10 is rotating, centrifugal forces acting upon the shaft 14 cause it to tilt relative to the housing 18 and fixed structure 20. The shaft 14, together with the bush 15, tilt relatively to the housing 18, the outer surface 16 of bush 15 rocking or rolling along the inner surface 17 of housing 18 to provide the tilting action. It will be appreciated that, if the rocking or rolling action takes place adjacent the lowermost part of the surfaces 16, 17, the uppermost portions of the surfaces will slide relative to one another. During the relative movement between bush 15 and housing 18, bobbin 25 will accommodate relative movement between the bush 15 and housing 18 and yet still provide the oil supply to the inner surface of the bush 15. The flats 28 milled on the outer surface of bobbin 25 allow the lateral movement required of bobbin 25.

The rocking or rolling movement between the bush 15 and housing 18 is preferable to pure sliding movement between these components since the former movement is more easily effected. The springs 21, 22 spring-bias the bush 15 and provide resilient members against which the bush 15 may be urged during the tilting action. Additionally, the springs 21, 22 bias the bush 15 to tilt it relative to the shaft when only a small load is on the bearing i.e. when shaft 14 is rotating but when the rotor 12 of the helicopter is stationary and the shaft 14 is therefore not tilted relatively to the housing 18. By tilting the bush 15 relatively to the shaft 14 no unobstructed axial flow passages for oil are formed between the shaft, bush and housing.

Bush 15 may be asymmetric about a central plane perpendicular to its axis such that the tilt of the bush with respect to the shaft 14 is cancelled out at one particular inclination of the shaft.

It will be appreciated that the invention is not restricted to the construction illustrated in the drawings since the tilting bush described may be used wih any shaft arrangement. Additionally, the bush 15 may support a roller bearing for a shaft and need not provide a plain bearing for the shaft.

We claim:

1. A bearing device comprising a bush, a shaft rotatably mounted within said bush and spaced therefrom by an annular gap, a fixed housing within which the bush is mounted, the outer surface of the bush being arcuate in a plane containing the axis of the shaft and abutting an inner surface of the fixed housing, the said inner surface being arcuate in the said plane, the radius of curvature of the inner surface of said housing being greater than the radius of curvature of the outer surface of said bush to permit the bush to rock within the housing and thus accommodate tilting of the shaft relative to the housing, and resilient means which bias the bush to a tilted position with respect to the housing and shaft and which prevent, unobstructed axial flow passages being formed between the shaft, bush and housing.

2. A bearing device as claimed in claim 1 wherein the inner surface of said bush provides a plain bearing for said shaft.

3. A bearing device as claimed in claim 1 wherein the biasing of the bush is provided by annular springs provided on each side of said bush.

4. A bearing device as claimed in claim 1 wherein means are provided for supplying oil to the inner surface of said bush.

5. A bearing device as claimed in claim 4 wherein said means comprises a substantially cylindrical bobbin with its axis radially disposed, the bobbin being situated within co-operating apertures in said housing, and bush respectively, the bobbin having an oil supply passageway therethrough and being provided with portions of reduced cross section to accommodate relative movement between said housing and bush.

6. A bearing device as claimed in claim 5 wherein said bobbin has annular flanges adjacent each of its ends being respectively disposed within said co-operating apertures, flats being formed at diametrically opposed positions on the external surface of said bobbin to provide said portions.

7. A bearing device as claimed in claim 5 wherein means are provided for preventing said bobbin from rotating about its longitudinal axis.

8. A bearing device as claimed in claim 1 wherein said bush is asymmetric about a central plane perpendicular to the axis of said bush.

References Cited

UNITED STATES PATENTS

| | | | |
|---|---|---|---|
| 2,032,466 | 3/1936 | Buckwalter | 308—72 |
| 3,004,803 | 10/1961 | Irwin | 308—194 |
| 3,194,011 | 7/1965 | Chaney | 170—135.4 |
| 3,195,649 | 7/1965 | Nichols et al. | 170—135.4 |

MARTIN P. SCHWADRON, *Primary Examiner.*

FRANK SUSKO, *Assistant Examiner.*